United States Patent [19]
Sakasegawa et al.

[11] 3,906,592
[45] Sept. 23, 1975

[54] WIRING OR PIPING CLAMP
[75] Inventors: Hiroshi Sakasegawa, Yokohama; Yasuo Shindome, Yokosuka, both of Japan
[73] Assignee: Nissan Motor Co., Ltd., Japan
[22] Filed: Apr. 25, 1974
[21] Appl. No.: 464,247

[52] U.S. Cl. .......... 24/73 AP; 24/81 CC; 24/255 SL
[51] Int. Cl.² ................................. A44B 21/00
[58] Field of Search ........ 24/73 CC, 81 CC, 73 SA, 24/73 AP, 255 SL; 248/74 A, 74 B

[56] References Cited
UNITED STATES PATENTS

| | | | |
|---|---|---|---|
| 1,164,613 | 12/1915 | Jewell | 24/81 CC UX |
| 1,816,301 | 7/1931 | Sundell | 248/74 A UX |
| 2,351,790 | 6/1944 | Tinnerman | 248/74 B |
| 2,431,379 | 11/1947 | Ellinwood | 248/74 B |
| 2,922,733 | 1/1960 | Henning | 248/74 B X |
| 3,392,727 | 7/1968 | Hanlon | 24/255 SL UX |
| 3,460,788 | 8/1969 | Goldman | 248/74 B |
| 3,526,934 | 9/1970 | Owen | 24/81 CC |
| 3,713,622 | 1/1973 | Dinger | 24/255 SL X |

*Primary Examiner*—Donald A. Griffin
*Attorney, Agent, or Firm*—Robert E. Burns; Emmanuel J. Lobato; Bruce L. Adams

[57] ABSTRACT

A clamp for fixing an electric or hydraulic line to a wall surface, comprising a pair of gripping portions hingedly connected to each other and end portions extending from the gripping portions and formed with holes to receive a screw by which the clamp is to be fastened to the wall surface, wherein the end portions are further formed of catch portions such as a hook and a projection integral with the end portions. The catch portions are adapted to releasably lock the gripping portions to each other so that a desired number of clamps can be temporarily fitted to the electric or hydraulic line before the line is fixed to the wall surface. The hinged connection between the gripping portions can be provided through formation of a lateral notch in an inner face of the clamp between the gripping portions.

10 Claims, 5 Drawing Figures

US Patent   Sept. 23, 1975   3,906,592
FIG. 1
PRIOR ART
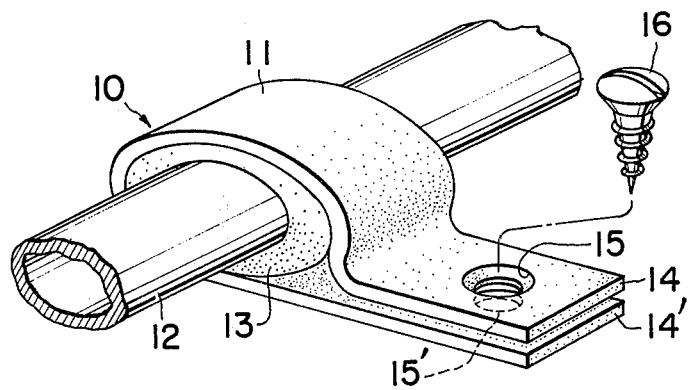
FIG. 2
PRIOR ART
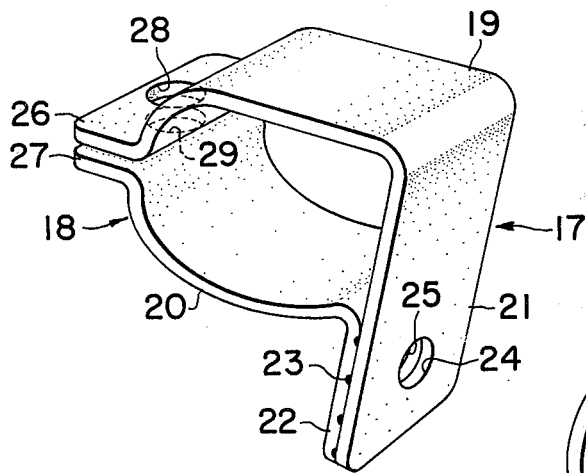
FIG. 3
PRIOR ART
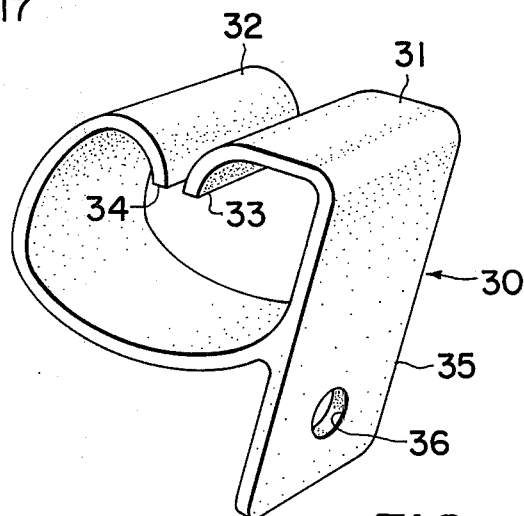
FIG. 4
FIG. 5
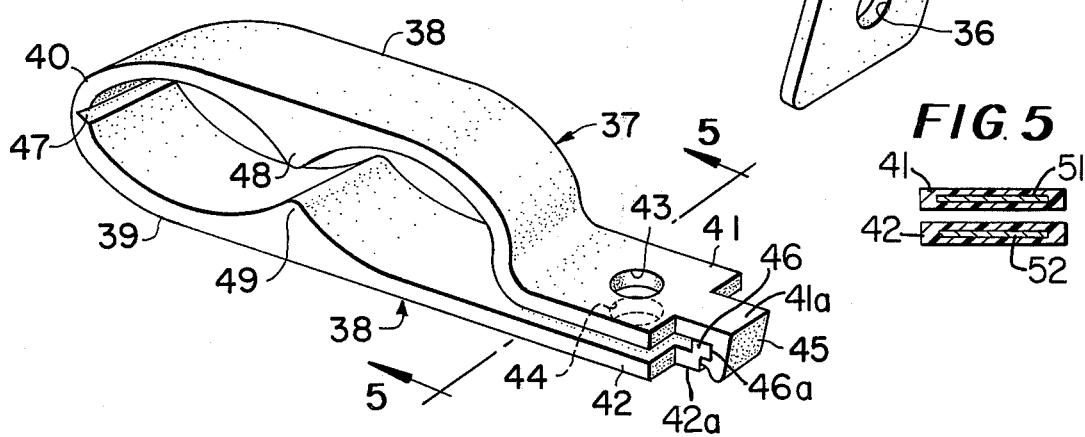

WIRING OR PIPING CLAMP

The present invention relates to fittings for electric conductors or conduits or pipings of hydraulic circuits and, more particularly, to clamps for fixing or anchoring electric conductors such as wires or cables or conduits containing the wires or cables or hydraulic pipings to surfaces of walls of domestic or other premises, industrial or household equipment, vehicles such as automobiles, or the like.

The conductor or piping clamps are generally used for the purpose of securely retaining the conductors or conduits pipings to the surfaces of the support walls so that the conductors, or conduits pipings are prevented from being dislodged or removed from the prescribed positions. For the fixing or anchoring of the conductor, conduit or piping to the wall surface with use of the clamps, it has been a usual practice to have one clamp fitted to the conductor, conduit or piping each time the conductor, conduit or piping is to be fixed at one spot to the wall surface and to thereafter have the clamp fastened to the wall by means, for example, of a tap screw in accordance with schedules preliminarily worked out. In other words, it has been impracticable because of the particular configuration of the prior art clamps to have all the necessary clamps temporarily fitted to the conductor, conduit or piping before the conductor, conduit or piping is to be fixed to the wall surface and to thereafter have the clamps fastened to the wall one after another. This has resulted in a limited efficiency of wiring jobs using the clamps and in a difficulty of making a minor change in the prescribed working schedules during the wiring or piping job. For the purpose, moreover, of fitting the clamp to the conductor, conduit or piping, it is required to prize open gripping members or portions of the clamp by fingertips and to thereafter have the conductor, conduit or piping slipped inbetween the gripping members or portions. For this reason and because, furthermore, of the fact that holes formed in the gripping members or portions to receive the tap screw tend to be mal-aligned with each other when the gripping members or portions are in positions capturing the conductor, conduit or piping, extremely laborious and cumbersome procedures have been indispensable for the wiring or piping operations using the prior art clamps. The present invention contemplates elimination of all the above mentioned drawbacks of the conductor or conduit clamps of prior art.

It is, accordingly, an important object of the present invention to provide an improved clamp which is adapted to achieve an increased efficiency in a wiring or piping job.

It is another important object of the invention to provide an improved clamp which will allow a minor change to be made in prescribed wiring schedules during wiring or piping operation.

It is still another important object of the invention to provide an improved clamp which can be temporarily or releasably fitted to a conductor, conduit or piping before the conductor, conduit or piping is finally fixed to a wall surface.

It is still another important object of the invention to provide an improved clamp having gripping portions or members which can be readily opened by fingertips for receiving a conductor, conduit or piping therebetween.

It is still another important object of the invention to provide an improved clamp having grip portions or members which can be accurately aligned with each other when held in positions to capture a conductor, conduit or piping therebetween.

Yet, it is another important object of the present invention to provide an improved clamp which is adapted to securely fix a conductor, conduit or piping to a wall surface and which is simple in construction and ready and economical to be manufactured.

In accordance with the present invention, these objects will be accomplished in a clamp which comprises a pair of gripping portions hingedly connected to each other for forming therebetween a space to retain a flexible line and end portions respectively extending from ends of the gripping portions opposite to the hinged end and formed with aligned holes to receive therein a fastening means and catch portions which are to be in releasable locking engagement with each other for releasably holding the gripping portions fast on each other. The hinged connection between the gripping portions may be provided through formation of an elongated notch in an inner face of the hinged end between the gripping portions. The catch portions may comprise a projection formed on one of the end portions and a hook formed on the other of the end portions and engageable with the projection when pressed thereupon. The term "flexible line" above mentioned should be construed to include an electric line such as a wire, a cable consisting of wires, or a conduit containing wires or cables or a hydraulic line such as a fluid feed piping incorporated into a hydraulic circuit.

The objects and features of the conductor or piping clamp according to the present invention will become more apparent from the following description taken in conjunction with the accompanying drawings, in which:

FIG. 1 is a perspective view which shows an example of the prior art clamp;

FIG. 2 is a perspective view which shows another example of the prior art clamp;

FIG. 3 is a perspective view which shows still another example of the prior art clamp;

FIG. 4 is a perspective view which shows a preferred embodiment of the clamp according to the present invention, and FIG. 5 in a cross section taken on the line 5—5 in FIG. 4.

Reference will now be made to the drawings, first to FIG. 1. The first example of the prior art clamp is shown to comprise an elongated metal strip 10 which has a generally rounded intermediate portion 11 to receive therein a wire, a cable, a hydraulic piping or, as shown, a wire-containing conduit 12 through a grummet 13. The metal strip 10 further has end portions 14 and 14' which extend from the rounded intermediate portion 11 and which are engageable with each other through surface-to-surface contact therebetween. The end portions 14 and 14' are formed with holes 15 and 15', respectively. The holes 15 and 15' are aligned with each other and are adapted to receive therein a tap screw 16. To have the conduit 12 fixed to a wall surface (not shown) with use of the clamp thus configured, the conduit 12 carried in the grummet 13 is first slipped into the rounded intermediate portion 12 of the clamp by forcing open the end portions 14 and 14' by finger tips and thereafter the clamp thus carrying the conduit 12 is fastened to the wall surface by driving the tap screw 16 into the wall through the screw receiving holes 15 and 15' in the end portions 14 and 14'.

Turning to FIG. 2, the second example of the prior art clamp is shown to comprise a first gripping member 17 having an outwardly bent intermediate portion 18 and a second gripping member 19 having an outwardly curved intermediate portion 20. The first and second gripping members 17 and 19 have respective end portions 21 and 22 which are spot welded to each other as at 23 and which are formed with aligned screw receiving holes 24 and 25, respectively. The gripping members 17 and 19 has other respective end portions 26 and 27 which are engageable with each other through surface-to-surface contact therebetween and which are formed with screw receiving holes 28 and 29, respectively. When in fixing a flexible line such as a wire, a cable, a conduit or a hydraulic piping (not shown) to a wall surface (not shown), the flexible line is first slipped in between the spaced intermediate portions 18 and 20 of the first and second gripping members 17 and 19 by forcing open the end portions 26 and 27 and thereafter the clamp thus carrying the flexible line is fixed to the wall surface by driving tap screws (not shown) into the wall through the aligned holes 24 and 25 in the rigidly combined end portions 21 and 22 and the aligned holes 28 and 29 in the engaged end portions 26 and 27, respectively.

While the examples of the prior art clamps illustrated in FIGS. 1 and 2 are usually made of metal, the clamp shown in FIG. 3 is formed of a plastic material. Referring to FIG. 3, the third example of the prior art clamp consists of a unitary member 30 having gripping portions 31 and 32 which form therebetween a space to pass an electric or hydraulic line (not shown) therethrough and which have respective end portions 33 and 34 which are inwardly bent or curved toward each other. The unitary member 30 has a projection 35 formed with a hole 36 which is adapted to receive therein a tap screw (not shown). To have the electric or hydraulic line fixed to a wall surface with use of the clamp thus configured, the line is first slipped in between the gripping portions 31 and 32 by forcing the line between the respective end portions 33 and 34 of the gripping portions 31 and 32 whereupon the clamp thus carrying the line is fastened to the wall surface by driving a tap screw (not shown) into the wall through the screw receiving hole 36 in the projection 35.

In the absence of means adapted to temporarily retain the electric or hydraulic line in any of the examples of the prior art clamps shown in FIGS. 1 to 3, the clamp of any of the configurations must be fitted to the electric or hydraulic line each time the line is to be fastened at one spot to the wall surface and thus it is impracticable to have a number of clamps temporarily retained to the electric or hydraulic line for the purpose of increasing the efficiency of a wiring job and leaving a room to make a minor change in the wiring or piping plan during the wiring operation, as previously noted. In the case of the metal clamp illustrated in FIG. 1 or 2, the gripping portions or members must be forced open by finger tips against the rigidity of the portions or members and, as a consequence, not only laborious procedures are required for the fitting of the clamp to the electric or hydraulic line but a problem is encountered in that the screw receiving holes in the clamp tend to be mal-aligned once the electric or hydraulic line has been slipped in between the gripping portions or members, as also pointed out previously. The goal of the present invention is to overcome all these drawbacks inherent in the examples of the prior art clamps illustrated in FIGS. 1 to 3.

Referring to FIG. 4, the clamp embodying the present invention to achieve such a goal comprises a unitary elongated member 37 having a pair of gripping portions 38 and 39 which are hingedly connected together at a hinged end 40 and which are spaced apart from each other so as to form therebetween a space for receiving electric or hydraulic lines. The elongated member 37 has end portions 41 and 42 extending opposite to the hinged end 40 from the gripping portions 38 and 39, respectively. The end portions 41 and 42 are superposed with each other and are formed with aligned screw receiving holes 43 and 44, respectively, which are adapted to receive therein a suitable fastening means such as a tap screw (not shown) for securely attaching the clamp to a wall surface (not shown). At their outer ends, the end portions 41 and 42 leave portions 41a and 42a respectively of reduced width. The end portion 41 of the elongated member 37 is formed at its outer end with a hook 45. The outer end portion 42 is formed at its outer end with a transversely extending inwardly offset portion 46 and a projecting lip 46a which is adapted to be seized by the hook 45 when the hook 45 is pressed onto the lip 46a. When the hook 45 is thus engaged with the lip 46a, the end portions 41 and 42 are secured together so that, if electric or hydraulic lines are received between the gripping portions 38 and 39, the clamp is securely retained on the electric or hydraulic lines. However in this condition the end portions 41 and 42 inboard of the offset portion 46 are spaced apart as seen in FIG. 4 by the engagement of the offset portion 46 with the end portion 41. When a screw inserted in the holes 43 and 44 and screwed into a wall is tightened, the offset portion 46 acts as a fulcrum about which the end portions pivot as they are drawn toward one another by the screw. The gripping portions are thereby caused to pivot about the hinged end 40 to grip the electric or hydraulic lines with the desired tightness. An elongated notch 47 is formed inside of the hinged end 40 so as to provide an efficient hinged connection between the gripping members 38 and 39. The clamp herein shown is assumed to be capable of retaining two electric or hydraulic lines and, as such, the spaced gripping portions 38 and 39 of the clamp are formed with inward projections 48 and 49 on their inner faces so as to isolate the electric or hydraulic lines from each other in the space between the gripping portions 38 and 39. It is, in this instance, apparent that such inward projections 38 and 39 may be dispensed with where the clamp embodying the present invention is to be so arranged as to retain a single electric or hydraulic line. The configurations of the hook 45 and the lip 46a to be engaged by the hook 45 are, moreover, merely by way of example and therefore may be modified in any desired manner insofar as the intent of temporarily or releasably holding the end portions 41 and 42 of the clamp in locked conditions when such catch portions are engaged by each other.

The unitary elongated member 37 in its entirety is formed of a material having a relatively large tenacity. A preferred example of such a material will be a hard plastic material which is adapted to be molded into the unitary member in a simple and economical process. If it is found that the plastic material has an insufficient mechanical strength, a core or cores of metal may be embedded in the unitary member of the plastic material. Thus for example in FIG. 5 there is shown a metal core having end portions 51 and 52 embedded respectively in end portions 41 and 42 of the clamp. Where the clamp embodying the present invention is thus formed of a plastic material, no such additional gripping means as the grommet will be required to be used in retaining the electric or hydraulic line to the clamp. This will be conducive to protecting the cleated electric or hydraulic line from being damaged by an abrasive contact and accordingly assurance of safety, reliability and prolonged service life of the wiring or piping.

To have an electric or hydraulic lines fixed to the wall surface with use of the clamps of the configuration illustrated in FIG. 4, the gripping portions 38 and 39 of each of the clamps are first opened wider about the hinged end 40 and thereafter the electric or hydraulic lines (which are in this instance assumed to be two in number as previously noted) are slipped inbetween the gripping portions 38 and 39 from a spacing between the end portions 41 and 42. The hook 45 on the end portion 41 is then pressed by a finger tip onto the lip 46a on the end portion 42 so that the end portions 41 and 42 are secured together and accordingly the electric or hydraulic lines carried by the clamp are secured between the gripping portions 38 and 39. A desired number of clamps are temporarily fitted to the electric or hydraulic lines in this manner whereupon the clamps are fastened one after another to the wall surface by driving a tap screw or other suitable fastening means into the wall through the screw receiving holes 43 and 44 of each of the clamps in accordance with a wiring or piping plan preliminarily worked out.

It will now be appreciated from the foregoing description that the clamp herein proposed is adapted to temporarily or releasably retain an electric or hydraulic line or lines because the gripping portions forming part of the clamp can be releasably locked to each other through engagement of the catch portions. Since, thus, all the necessary clamps can be temporarily retained to the electric or hydraulic line or lines prior to the fixing of the line or lines to the wall surface, the wiring or piping operation can be carried out efficiently and effortlessly by fastening the clamps carrying the electric or hydraulic line or lines to the wall surface one after another without returning to the procedures to fit the clamps to the line or lines. Since, moreover, the hinged end of the gripping portions is formed with the elongated notch, the gripping portions can be turned about the hinged end by a soft finger pressure so that the electric or hydraulic line or lines can be readily seized between the gripping portions. The gripping portions are turned relative to each other at all times about the hinged end and, as a consequence, the alignment between the screw receiving holes formed in the end portions of the elongated unitary member is maintained even after the end portions formed with the holes have been opened to have the electric or hydraulic line or lines slipped therethrough. It may also be mentioned that, because the hinged end can be constituted simply by the formation of the elongated notch between the gripping portions or, in other words, without use of an actual hinge or a pivotal pin, the clamp in its entirety can be constructed as a simple unitary structure which is ready to be manufactured.

What is claimed is:

1. A clamp for fixing a flexible line to a surface of a support wall, comprising:
   a pair of gripping portions hingedly connected to each other through a hinged end for forming therebetween a space to receive therein the flexible line;
   end portions respectively extending opposite to the hinged end from the gripping portions and formed with aligned holes to receive therethrough a fastening means by which the clamp is to be fastened to the wall surface;
   cooperating securing means at the outer ends of said end portions for releasably securing said end portions together and thereby maintaining said clamp in closed condition, and
   spacing means adjacent the outer ends of said end portions for spacing said end portions apart inboard of said spacing means when said end portions are secured together by said securing means, said spacing means acting as a fulcrum about which said end portions pivot when fastening means received in said holes is tightened and thereby clamp said flexible line with selected tightness.

2. A clamp according to claim 1 in which said spacing means comprises a transversely extending inwardly offset portion at the outer end of at least one of said end portions engageable with the opposite end portion.

3. A clamp according to claim 2 in which one of said end portions is provided at its outer end with a hook and the other of said end portions is provided with an inwardly offset portion engageable with said first end portions to space said end portions apart inboard of said offset portion and a projecting lip engageable by said hook.

4. A clamp according to claim 1, in which said gripping portions, said end portions, said securing means and said spacing means are formed as a one piece integral member.

5. A clamp according to claim 4, in which said hinged end is formed in its inner face with a transversely extending groove which decreases the thickness of material at said hinged end and increases flexibility of the hinged connection between said gripping portions.

6. A clamp according to claim 5, in which said member is formed of resilient high tenacity material.

7. A clamp according to claim 6, in which said member is formed of a plastic material.

8. A clamp according to claim 7, in which said member has embedded therein a core of metal.

9. A clamp according to claim 1 in which at least one of said gripping portions is formed with a projection on its inner face dividing the space within said clamp into spaces for a plurality of said flexible lines, said projection extending between and separating said lines.

10. A clamp according to claim 1 in which said end portions at their outer ends have portions of reduced width, said securing means and said spacing means being on said reduced width portions.

* * * * *